(12) United States Patent
Lewis et al.

(10) Patent No.: US 6,192,255 B1
(45) Date of Patent: *Feb. 20, 2001

(54) COMMUNICATION SYSTEM AND METHODS FOR ENHANCED INFORMATION TRANSFER

(75) Inventors: Russell F. Lewis, Dallas; Mark B. Shadowens, Irving; Gerhard Paul Heinrich Deffner, Dallas; Gerald G. Birdwell, Richardson, all of TX (US)

(73) Assignee: Texas Instruments Incorporated, Dallas, TX (US)

( * ) Notice: Under 35 U.S.C. 154(b), the term of this patent shall be extended for 0 days.

This patent is subject to a terminal disclaimer.

(21) Appl. No.: 07/991,013

(22) Filed: Dec. 15, 1992

(51) Int. Cl.$^7$ .................................................... H04M 1/00
(52) U.S. Cl. ............................ 455/558; 455/66; 455/74; 455/550; 455/557
(58) Field of Search ................................... 455/433, 434, 455/357, 58, 59, 56.1, 74, 11.1, 347, 349, 52.1; 381/43, 51

(56) References Cited

U.S. PATENT DOCUMENTS

| | | | |
|---|---|---|---|
| 4,153,937 | 5/1979 | Poland | 364/706 |
| 4,295,181 | 10/1981 | Chang et al. | 361/395 |
| 4,712,242 | 12/1987 | Rajasekaran et al. | 381/42 |
| 4,797,924 | * 1/1989 | Schnars et al. | 381/43 |
| 4,882,757 | 11/1989 | Fisher et al. | 381/43 |
| 4,908,865 | 3/1990 | Doddington et al. | 381/43 |
| 4,928,302 | * 5/1990 | Kaneuchi et al. | 379/88 |
| 5,138,649 | 8/1992 | Krisbergh et al. | 379/56 |
| 5,148,471 | * 9/1992 | Metroka et al. | 379/58 |
| 5,220,595 | * 6/1993 | Vehara | 379/74 |
| 5,335,273 | * 8/1994 | Takagi et al. | 379/433 |

FOREIGN PATENT DOCUMENTS

| | | | |
|---|---|---|---|
| 9009707 | * 8/1990 | (WO) | 455/54.2 |

OTHER PUBLICATIONS

Description, installation, operation and maintenance manual for Northern Telecom Limited's integrated services network: *Meridian© M3000 Touchphone©*; Practice 553-2201-115, Issued: 86 07 29, Standard, Printed in the U.S.A.; ©/Northern Telecom Limited 1986; 7 Chapters w/total/68 pp.

(List continued on next page.)

*Primary Examiner*—Lee Nguyen
(74) *Attorney, Agent, or Firm*—Ronald O. Neerings; Bobby T. Holland; Frederick J. Telecky, Jr.

(57) ABSTRACT

A communication system (20) is provided with multiple purpose personal communication devices (50 and 150). Each communication device (50 and 150) includes a touch-sensitive visual display (60 and 160) to communicate text and graphic information to and from the user and for operating the communication device (50 and 150). Voice activation (78) and voice control capabilities (76) are included within communication devices (50 and 150) to perform the same functions as the touch-sensitive visual display (60 and 160). The communication device includes a built-in modem (82), audio input and output (52 and 53), telephone jacks (86), and wireless communication (90). A plurality of application modules (100) are used with personal communication devices (50 and 150) to perform a wide variety of communication functions such as information retrievable, on-line data base services, electronic and voice mail. Communication devices (50 and 150) and application modules (100) cooperate to allow integrating multiple functions such as real time communication, information storage and processing, specialized information services, and remote control of other equipment into an intuitively user friendly apparatus. The system (20) includes both desktop (150) and hand-held communication devices (50) with the same full range of communication capabilities provided in each type of communication device (50 and 150).

24 Claims, 6 Drawing Sheets

OTHER PUBLICATIONS

Catherine Plaisant & Andrew Sears, "Touchscreen Interfaces for Alpha–numeric Data Entry", *Proceedings of the Human Factors Society 36th Annual* Meeting—1992, pp. 293–297.

Panos Papamichalis and Jay Reiner, "16. Implementation of the Data Encryption Standard Using the TMS 32010", *Theory, Algorithms and Implementations*, vol. 1, Texas Instruments Digital Signal Processing Applications with the TMS320 Family, 1989, pp. 455–465.

1993 Catalog, "Executive's Guide to Electronic Organizers", Rupp Technology Corp., pp. 1–15.

Bell Atlantic News, "Voice Command Telephoning Being Trialed at Bell Atlantic", Dec. 17, pp. 1–4.

Texas Instruments Voice Dialing Services, DBP089, Texas Instruments.

Texas Instruments Multiserve Media Server, DPPS300, Aug. 1992 2M.

"Enhanced Information Services Technical Report", Texas Instruments Telecom Systems, DBPB088, Dec. 1991, pp. 1–19.

"TI Announces Multiserve™ Telecommunications Platform", New Release ITG–005, Texas Instruments, pp. 1–5.

"TI and Speech: Pioneering a New Era of Enhanced Telecom Applications", Texas Instruments, Editorial Backgrounder, pp. 1–6.

"Wizard. The Gift of Organization." Sharp Electronics Corp. (ad).

Texas Instruments Multimedia Processor, DBPS299, Dec. 1991 2M.

Enhanced Information Services, "A Strategic Approach" pp. 1–12, Texas Instruments Telecom Systems.

"Remote Controls" Consumers Reports, Dec. 1992, pp. 796–799.

Arthur Kupfer "Phones That will Work Anywhere" *Fortune*, Aug. 24, 1992, pp. 100–112.

Seattle Times "Technology", The Dallas Morning News, Sunday, Oct. 18, 1992, p. 6H.

Louis A. Blatt & Alan Schell, "Gesture Set Economics for Text and Spreadsheet Editors", *Proceedings of the Human Factors Society 34th* Annual Meeting—1990, pp. 410–414.

* cited by examiner

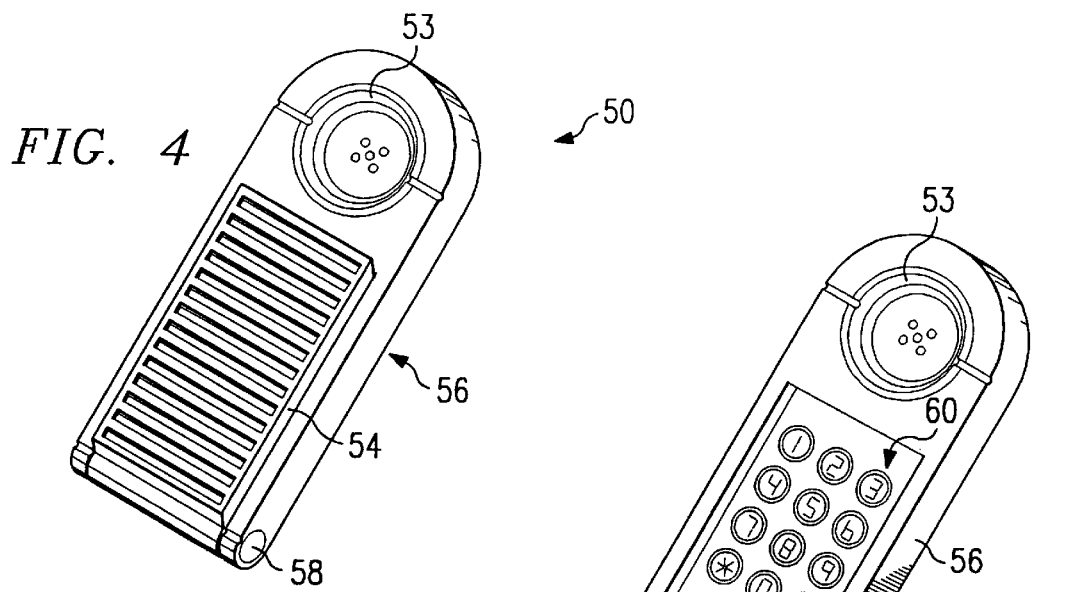
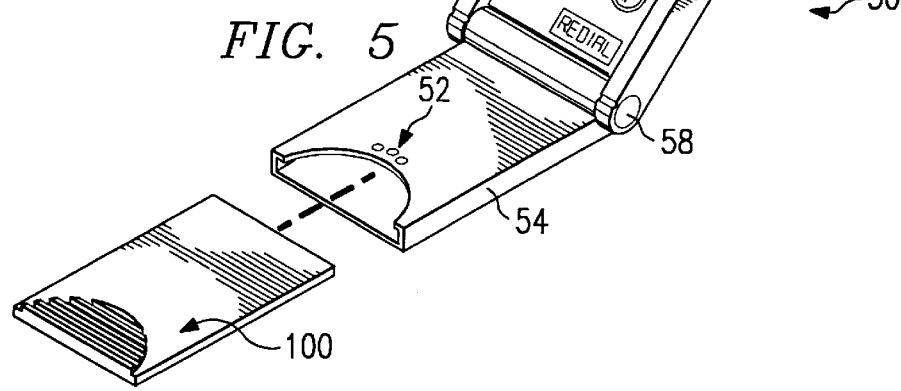
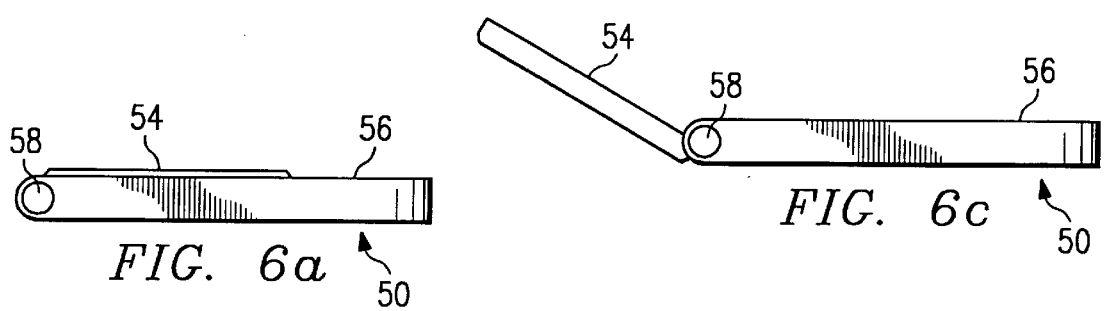
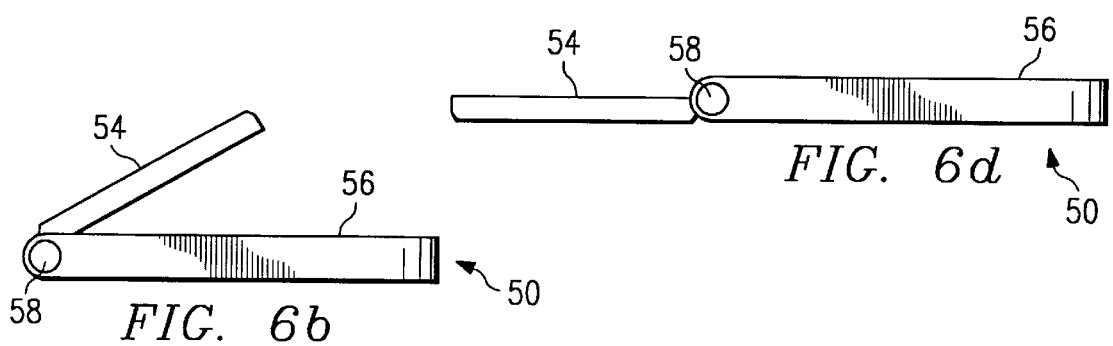

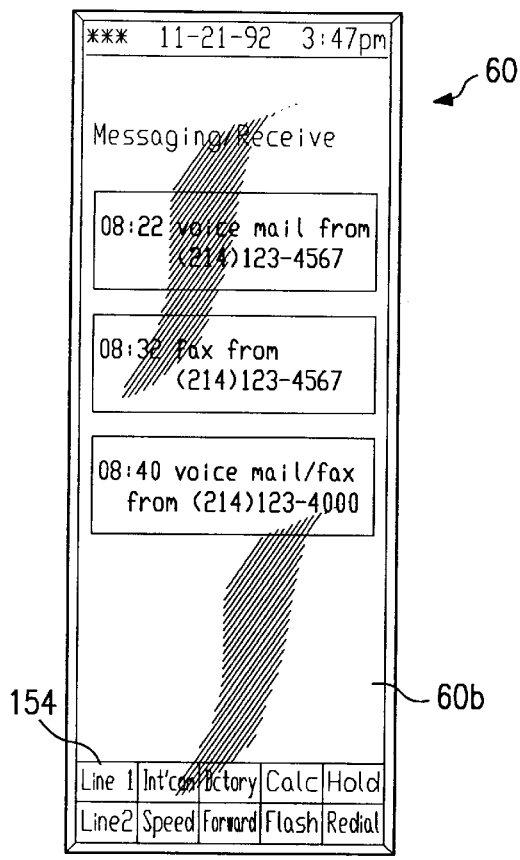
FIG. 9a
FIG. 9b
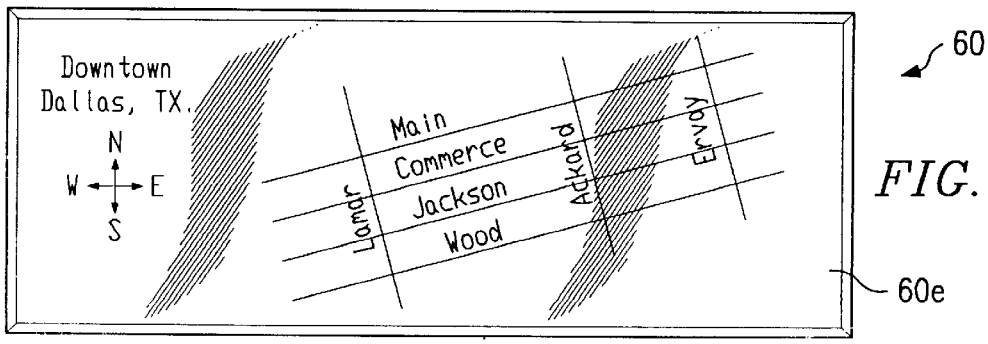
FIG. 9c
FIG. 9d

COMMUNICATION SYSTEM AND METHODS FOR ENHANCED INFORMATION TRANSFER

RELATED APPLICATIONS

This patent application is related to the following co-pending patent applications:
Application Ser. No.: 07/990,588 filed on Dec. 15, 1992;
Application Ser. No.: 07/991,628 now U.S. Pat. No. 5,335,276 filed on Dec. 15, 1992;
Application Ser. No.: 07/991,015 filed on Dec. 15, 1992;
Application Serial No.: 07/993,947 filed on Dec. 15, 1992;
Application Ser. No.: 07/992,384 filed on Dec. 15, 1992; and
Application Ser. No.: 07/992,291 filed on Dec. 15, 1992, abandoned.

TECHNICAL FIELD OF THE INVENTION

This invention relates to communication and information storage and processing systems and more particularly to communication devices with processors, expanded memory capability, and visual displays for enhanced communication and information storage and processing.

BACKGROUND OF THE INVENTION

The communication industry is rapidly changing and offers a wide variety of new products and services. The number of different services and the volume of information available to consumers and business users continues to grow on almost an exponential basis. At the same time, rapid improvements are being made in telephone equipment and communication systems. The cellular telephone, facsimile machine, and modem, that are offered for sale today, may be obsolete within a short period of time. Several companies are proposing elaborate communication networks using telephone wires, satellites, fiber optic cables, radio waves and advanced electronic devices which will allow worldwide communication from a telephone.

Significant problems associated with the rapidly expanding number of different information services and data bases and the different types of new equipment include the wide variety of media formats, the lack of interchangeability both in hardware and software, and the need for continuous operator training. Frequently, highly valuable information can become obsolete and of no value if it is not quickly and easily understood by the user. Also, each information service and each new piece of equipment generally has a different format for presenting information to the user or for accepting information from the user. The lack of standardization in equipment, format display, operating procedures, and input/output devices results in substantially limiting the scope, accessibility, and value of potentially available information.

Special purpose radio transmitters and receivers are used for selected information such as the National Oceanic & Atmospheric Administration weather reports or commercial information from the Dow-Jones news service. These special information services frequently require a dedicated, specifically tuned radio receiver and transmitter. These systems and their related equipment are generally limited to the special service for which they were originally designed and have highly restricted information sources and formats.

Another problem is maintaining security of the data bases and allowing only authorized access to selected information. Present telecommunication systems tend to rely upon time consuming verification procedures with identification numbers, code numbers, etc. to prevent fraud and use of stolen equipment and information.

Another problem with present systems is that the transmission bandwidth for today's telephone systems (audio, digital tone, and rotary pulses) is insufficient for delivery of multi-media information to consumers in a timely, coherent manner. Cellular and mobile phones have been available for some time; however, they are generally limited to only audio input and output. Cellular phones generally have a traditional mechanical or electrical numerical keypad. In order to update a cellular telephone as improved technology becomes available, the old cellular phone must be replaced with a new cellular telephone.

Various devices for use with personal computers, e.g., Wizard® by Sharp®, are offered to improve user productivity. These devices generally do not provide for two-way interactive communication with a remote source similar to telephones. They generally require a multiple wire cable between the personal productivity device and the personal computer. They frequently require batch uploads and batch downloads of data with no modem capability. The personal productivity devices generally have an input and output capability limited to the available small keypad. Audio input and output is generally not available and little or no graphic information capability is provided.

While prior telephone systems have worked satisfactorily, as new communication networks are established and information data bases rapidly increase, a need for instant customer verification and identification will become more important. Teaching consumers the operating procedures for new equipment and new software packages presents a significant limitation to full use and commercial success of these new communication and information systems. It will also be necessary to send the maximum amount of information in the shortest possible time period to allow more communication over limited frequency spectrums.

Therefore, a need has arisen for a communication system with enhanced capability for data handling (storage, retrieval, and transmission), secure two-way communication when desired, and enhanced information presentation along with an easy to operate and understand communication device.

SUMMARY OF THE INVENTION

In accordance with the present invention, a communication system along with equipment and methods for enhanced information storage, processing and exchange is provided that substantially eliminates disadvantages and problems associated with previous communication systems and methods.

A multiple purpose communication system is provided with personal communication devices for enhanced exchange of information using the full capabilities of the electromagnetic energy spectrum. The communication devices include a touch-sensitive visual display which significantly enhances the communication of visual and graphic information to and from the user. The touch-sensitive visual display also provides the basis for an intuitive user interface between the communication device and the communication system. The communication devices incorporate microprocessors and associated electronic circuits to provide a wide range of communication capability while maintaining many of the user friendly characteristics associated with conventional telephones.

In accordance with one aspect of the invention, a handheld communication device is provided for use with either wireless (cellular or other assigned frequencies) or standard telephone lines and telephone jacks. The communication device may include a microphone and speaker for audio input and output, a modem for high speed transmission of information in a digital format, and a touch-sensitive visual display. Headsets may also be provided as part of the audio output circuit. Application modules containing a microprocessor and associated electronic circuits, and memory components may be inserted into the communication device to perform different communication and information transfer functions.

An important technical advantage of the present invention is that communication capabilities and options of the system maybe greatly expanded without requiring replacement of the basic personal communication devices and without requiring extensive retraining of the user.

In accordance with another aspect of the invention, a multiple purpose communication system is provided with communication devices having three broad categories of applications:
resident applications and core programs stored in a personal communication device;
applications based on separate application modules; and
applications provided from external information services.
Core programs and applications contained within the communication device may include modem capability, customized data and preferences for each user, basic telephone and pager services, and utility programs to upload and download the various application modules.

The separate application modules, used with each communication device, may provide the following applications:
a personal profile for each user including telephone directory;
personal information—calendars, daily and weekly reminders;
communication security; and
expanded information storage and processing.
The application modules may also be used to provide applications for outside services such as Compuserve, Prodigy, Dow-Jones news retrieval service, weather service, city map locator and navigation service, electronic and voice mail capabilities, and other on-line data base services, and may have facsimile transmission capabilities.

An important technical advantage of the present invention is that separate application modules are available to allow maximum use of the electromagnetic energy spectrum. For example, one application module may allow the communication device to operate at the required frequency and with appropriate protocols for a conventional cellular telephone network. Another application module may have the required frequency and protocols to allow the communication device to function as a cordless telephone. In the same manner, application modules may be provided to allow the personal communication device to function in an industrial control environment, a wireless broadcasting system, or for infrared communication such as found in remote controlled televisions and video cassette recorders. The present invention provides application modules with required frequency, protocols, and in some cases a microstrip antenna to allow use of the associated personal communication device in each of the available segments of the electromagnetic energy spectrum. The present invention allows for simply removing one application module and inserting another application module to allow use of multiple communication networks by each personal communication device.

The present invention has another significant technical advantages in that a communication system is provided using personal communication devices with enhanced information exchange and storage capability that may be modified by inserting different application modules. Separate application modules are provided for selected information transfer and communication functions. The overall system may be quickly upgraded and modified by changing the separate application modules without requiring modification or change to the basic personal communication device. Therefore, the communication system may be continually used and maintained at the leading edge of technology by simply revising and updating the desired application modules. Furthermore, the application modules may be carried in a small container that allows easy transportation and storage while providing maximum information capability and communicate network versatility.

The present invention has another significant technical advantage in that the communication devices may perform a wide range of functions resulting from the use of microprocessors and associated integrated circuits. These functions include a modem for the high speed transfer of information and a touch-sensitive visual display. The touch sensitive visual display provides both enhanced information to the user and improves the ease and reliability of operating the communication device. The interactive visual display provides a user interface which intuitively integrates multiple communication, information and control functions.

An additional technical advantage of the present invention is the use of the personal communication device with application modules which respond to voice commands and are voice activated. Functions that are carried out with a keyboard on personal computers or the touch-sensitive visual display of the personnel communication device may also be carried out through recognition of selected voice commands. By including voice recognition and voice activation within a selected application module or the personal communication device as desired, improved security may be obtained and enhanced communication functions provided. An application module with a transponder incorporating the present invention may be inserted into the communication device to allow a communication network such as found in an airport or other building to recognize the presence of and identify the communication device and the user. The user's voice commands could then be recognized on the communication device and numbers automatically dialed, such as telephone numbers presented on the visual display for dialing or other selected information presented based on the specific communication network and transponder. The numbers can be dialed by either using the touch-sensitive visual display or spoken commands. Authentication can be conducted by using personal identification numbers through the touch-sensitive visual display or by voice recognition and the use of passwords to activate various communication networks associated with the personal communication device. Additionally, spoken commands may be used to select different applications and programs for use with the personal communication device.

The present invention has further technical advantages in that the audio transmission from the communication device is substantially enhanced as compared to conventional telephones, cellular telephones and mobile radio systems. The communication device includes a digital signal processing circuit which cancels ambient noise associated with the outgoing or transmitted signal to remove ambient noise associated with the transmitting environment. The digital signal processing circuit also cancels ambient noise which is superimposed on incoming or received signals to reduce the perception of receiving environmental noise along with the received signal. The digital signal processing circuit includes a filter network to remove stable sound pattern characteristics from the transmission system. An important feature of the present invention is that the microprocessor-based digital signal processing circuit allows installation of algorithms and modification of the algorithm as changes occur both in the receiving and transmitting operating environment. A second microphone may also be provided in the communication device to aid in cancelling ambient noise.

An additional significant technical advantage of the present invention is improved security to prevent unauthorized interception of information transmission, particularly with respect to mobile communication devices. The communication system of the present invention allows encryption and decryption to take place both within the communication device of the individual user and between the communication device and a central data base computer which maintains each user's account and billing files. The encryption and decryption scheme may be hard wired into each communication device as part of the resident applications. Or, the encryption device may be provided as part of one of the application modules used with the communication device. The encryption and decryption scheme may be voice activated and installed at the central data base or central service facility. The individual communication devices may contain a general encryption circuit for voice verification with parameters of the user's voice and the decryption scheme maintained at a central facility or within each communication device. Any compatible communication device may be used with the communication system rather than having each communication device programmed for each specific user. Thus, the present invention allows for secured transmissions when desired by the user without requiring the user to carry a separate scrambler or other secure communication equipment.

Another technical advantage of the present invention is the integration of communication functions such as information services, telephone, voice mail, etc. with control functions such as operating televisions, video cassette recorders, garage doors, etc. and with information storage functions such as phone lists, business data, calendar schedules, etc. This integration is accomplished by having a communication device which accepts application modules to perform these various functions.

BRIEF DESCRIPTION OF THE DRAWINGS

For a more complete understanding of the present invention and the advantages thereof, reference is now made to the following description taken in conjunction with the accompanying drawings, in which:

FIG. 4 is an isometric drawing of the hand-held communication device from FIG. 1 in its first or closed position;

FIG. 5 is an isometric drawing of the hand-held device from FIG. 1 showing installation of an application module;

FIG. 6a is a side view in elevation of the hand-held communication device from FIG. 1 in its closed position;

FIG. 6b is a drawing in elevation of the hand-held communication device from FIG. 1 in its standby position;

FIG. 6c is a drawing in elevation showing the hand-held device from FIG. 1 in its telephone operating mode;

FIG. 6d is a drawing in elevation showing the hand-held communicating device from FIG. 1 in its fully functional operating mode;

FIG. 9a is a schematic drawing of the interactive visual display used with communication devices of the present invention providing voice mail applications;

FIG. 9b is a schematic drawing of the interactive visual display from FIG. 9a used to provide a price list;

FIG. 9c is a schematic drawing of the interactive visual display from FIG. 9a used to provide stock quotations;

FIG. 9d is a schematic drawing of the interactive visual display from FIG. 9a used to provide map information.

DETAILED DESCRIPTION OF THE INVENTION

The preferred embodiments of the present invention and its advantages are best understood by referring to FIGS. 1–10 of the drawings, like numerals being used for like and corresponding parts of the various drawings.

Figure 1:
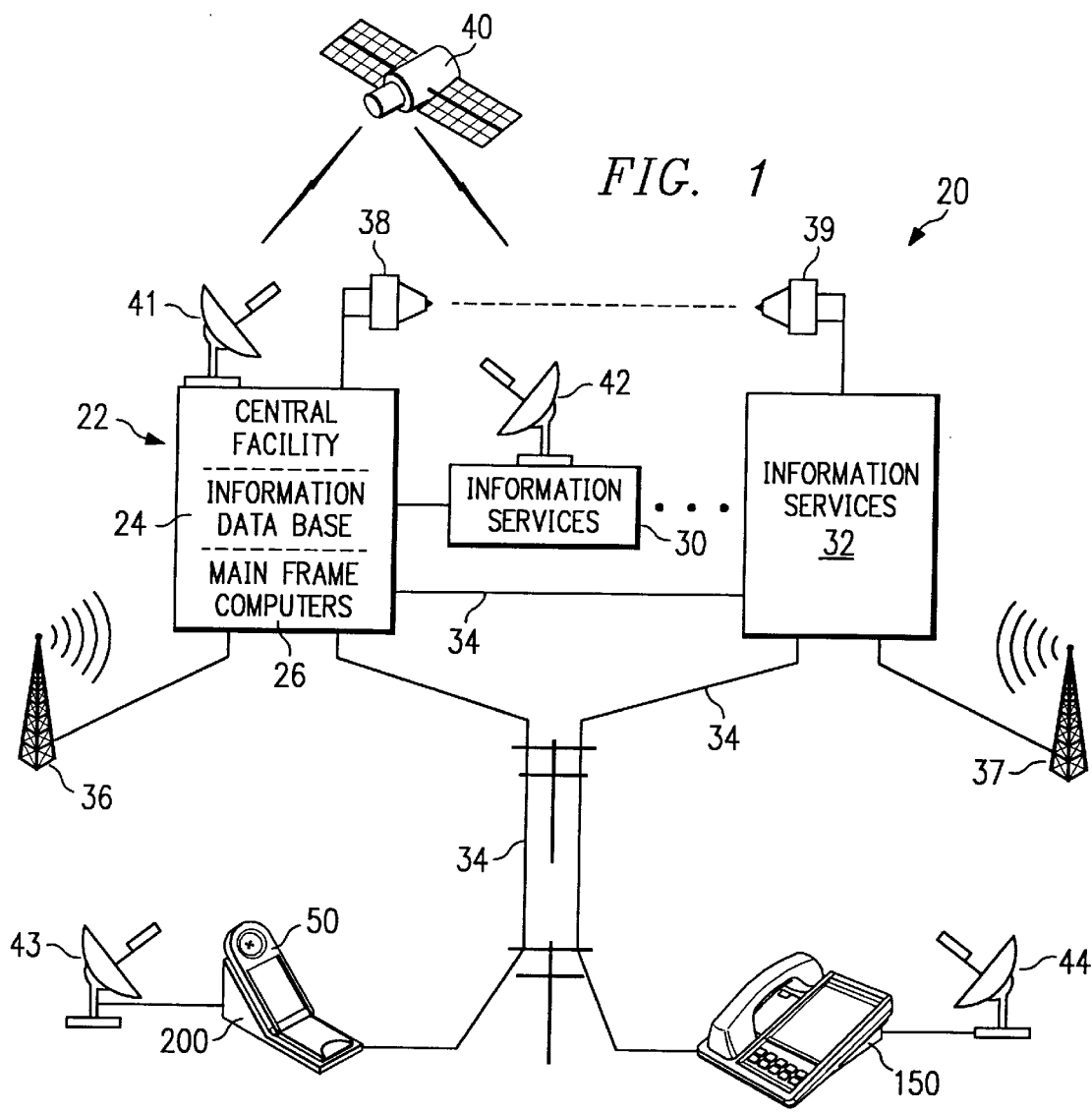
FIG. 1 is a schematic drawing of a communication system incorporating the present invention.

Communication system 20 is shown in FIG. 1 incorporating various components and features of the present invention. The major components of communication system 20 comprise central facility 22, one or more independent information services 30 and 32, hand-held communication device 50, and desktop communication device 150. The principal components of communication system 20 may be connected with each other by various communication networks such as land lines 34, broadcast antennas 36 and 37, microwave antennas 38 and 39, or satellite 40 and its associated satellite transmitters and receivers 41, 42, 43, and 44. Land lines 34 may be conventional telephone wires and telephone cables or fiber optic cables.

Central facility 22 preferably has one or more information data bases 24 and one or more mainframe computers 26. Communication system 20 may include several central facilities 22 which are linked to each other via land lines 34, satellite 40, microwave antennas 38 and 39, or other types of communication networks. Antennas 36 and 37 may transmit and receive information throughout the complete spectrum of radio frequencies including commercial radio, cellular telephones, and other special information exchange frequencies. Hand-held communication device 50 and desktop communication device 150 may receive information from central facility 22 via land lines 34 or various radio frequencies including a satellite communication network.

Information services 30 and 32 may provide information to central facility 22 via satellite transmission, microwave transmission, broadcast antenna 37 or land lines 34. Central facility 22 may in turn make this information available to communication devices 50 and 150 via any of the previously mentioned communication networks. Information services 30 and 32 may also provide information directly to communication devices 50 and 150. An important feature of communication system 20 is the wide range of flexibility in choosing specific communication networks for the exchange of information and routing information to or from various sources and the user. The present invention allows communication devices 50 and 150 to receive information from a plurality of sources through a wide variety of communication networks and still present the information to the user in a standardized, familiar format. The present invention does not require a different communication device for each information service or each communication network.

Figure 2:
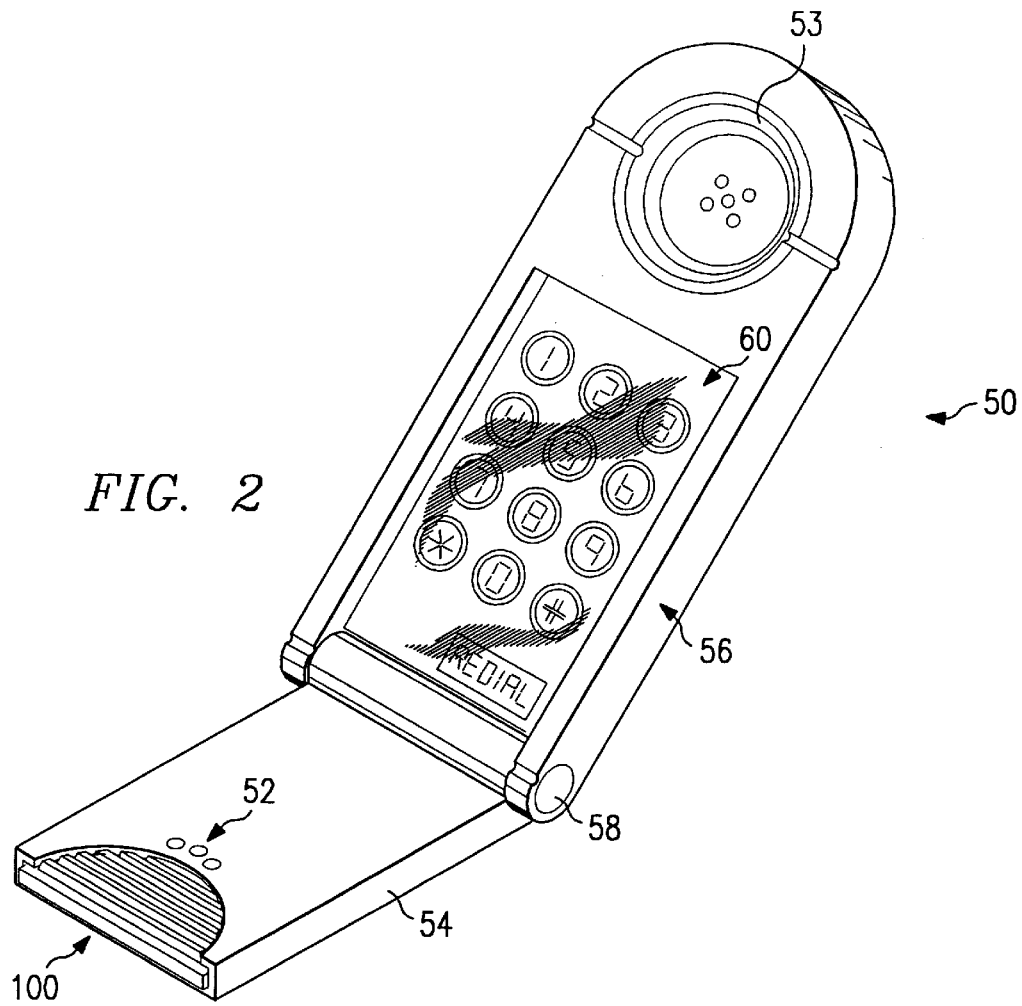
FIG. 2 is an isometric drawing of a hand-held communication device incorporating the present invention for use with the communication system of FIG. 1.
Figure 3:
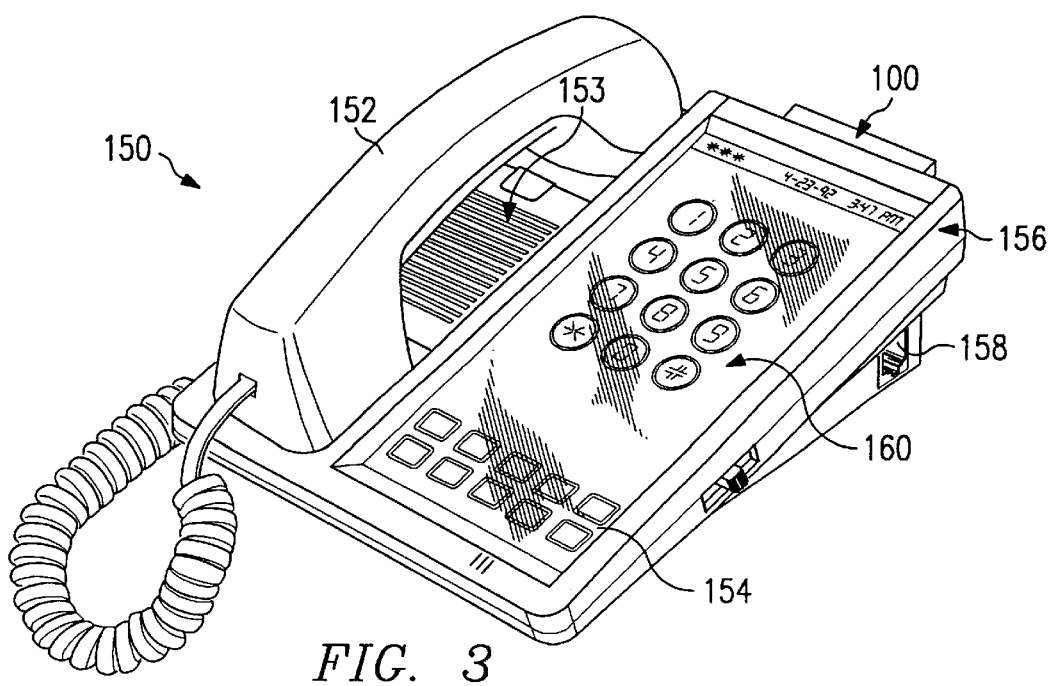
FIG. 3 is an isometric drawing of a desk-top communication device incorporating the present invention for use with the communication system of FIG. 1.

Personal communication devices 50 and 150 incorporating the present invention are shown in FIGS. 2 and 3. Communication device 50 has the general configuration of a hand-held cellular telephone comprising a microphone 52, speaker 53, lid 54 which is connected to main body 56 by pivot pin 58 and interactive visual display 60. Speaker 53 and microphone 52 are used to receive and transmit voice and other auditory information.

Communication device 150 has the general configuration of a desktop telephone with handle 152 and associated microphone and speaker, keypad 154, main body 156, and interactive visual display 160. Combined microphone and speaker 153 may also be included as part of main body 156. Communication device 150 includes connection port 158 which may be used to connect communication device 150 to land lines 34 or satellite transmitter/receiver 44. Connection port 158 may be a standard telephone jack such as phone line connection 86 and/or computer terminal 88 shown in electrical circuits 62 of FIG. 7. Desktop console 200 shown in FIG. 1 may be used with hand-held communication device 50 to provide similar connections with land lines 34, satellite transmitter/receiver 43, or a personal computer (not shown).

Interactive visual displays 60 and 160 are substantially identical in all respects except for their exterior dimensions which are selected for compatibility with their respective communication devices 50 and 150. In the following written description, references will frequently be made to visual display 60 in describing electrical circuits 62 of FIG. 7 and electrical circuits 262 of FIG. 8. Unless otherwise noted, visual display 160 may be substituted for visual display 60. As will be apparent from reading the following written description, an important feature of the present invention is the standardization and interchangeability of the various components associated with communication device 50 and communication device 150. Except for lid 54 which is unique to hand-held communication device 50 and telephone handle 152 which is unique to communication device 150, the electrical circuits, electrical components, communication functions and applications described for one communication device 50 or 150 apply equally well to the other communication device 50 or 150. This commonality substantially reduces training requirements for users of communication system 20, reduces the time required to upgrade and improve the communication functions and services offered by communication system 20, and reduces the cost associated with initially establishing communication system 20 and longterm maintenance and repair of communication system 20.

Figure 7:
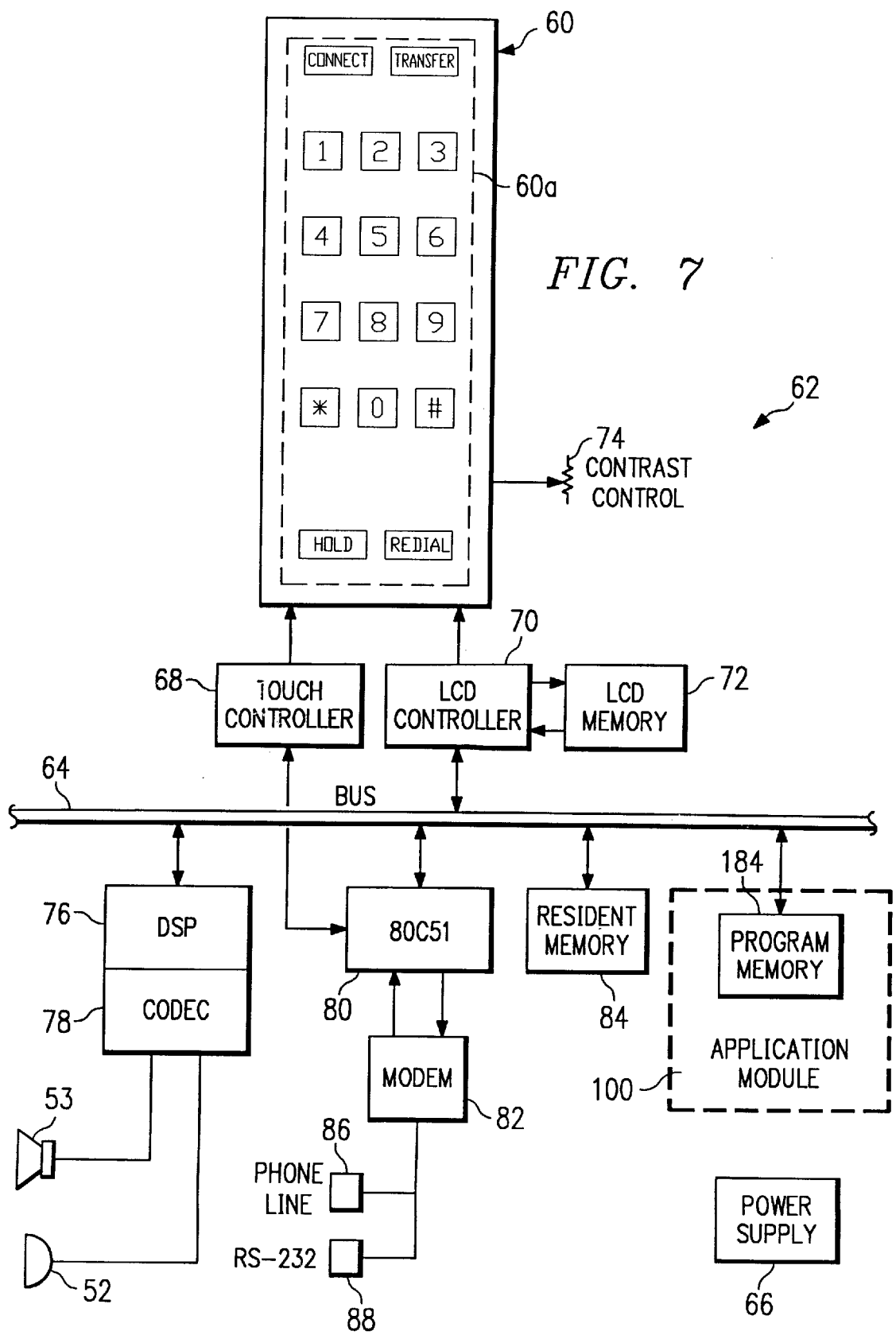
FIG. 7 is a block diagram of the electrical circuit used to operate a communication device in accordance with one embodiment of the present invention.
Figure 8:
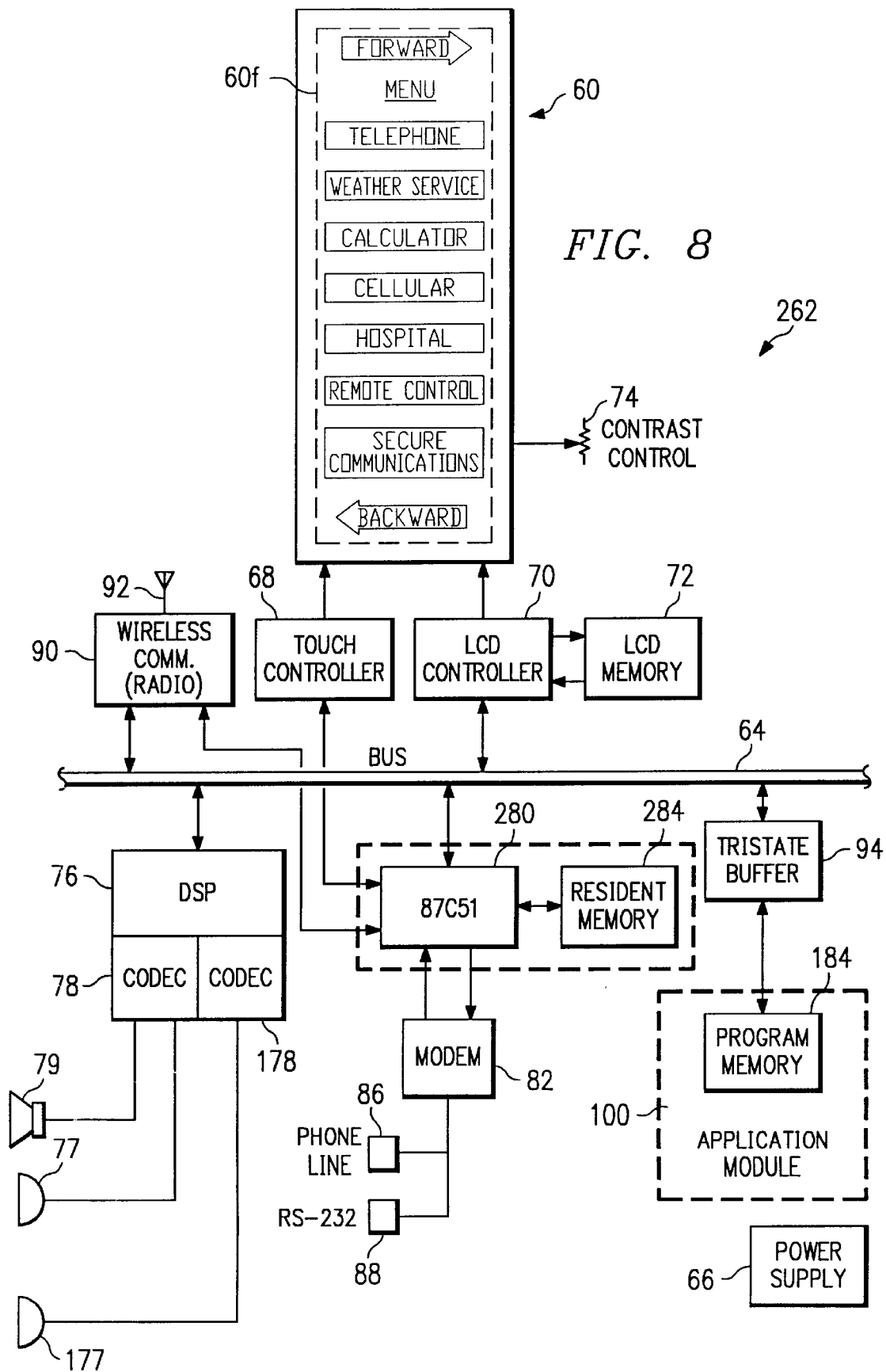
FIG. 8 is a block diagram for an electrical circuit used to operate a communication device in accordance with another embodiment of the present invention.

For hand-held communication device 50, lid 54 performs several important functions as shown in FIGS. 4, 5 and 6a through 6d. Hand-held communication device 50 is normally powered by one or more batteries except when communication device 50 is electrically connected with desk top console 200. The electrical components and circuits contained within communication device 50 will be described later in more detail. However, avoiding any unnecessary use of electrical energy from any batteries within power supply 66 shown in FIGS. 7 and 8 is an important feature of the present invention. The position of lid 54 may be monitored by a mechanical switch, shaft potentiometer, or shaft encoder (not shown) as appropriate for electrical circuits 62 or 262 associated with communication device 50.

When lid 54 is in its first, closed position as shown in FIGS. 4 and 6a, most of the electrical circuits associated with communication device 50 are deenergized or placed in an inactive state. When lid 54 is closed, only a very few selected electrical circuits will be energized such as a timer, telephone ringing circuit, pager circuit or a preset alarm. Processor 80 of electrical circuit 62 or processor 280 of electrical circuit 262 in cooperation with either its associated interactive visual display 60 or 160 or digital signal processor 76 can select the electrical circuits which will remain energized when lid 54 is closed. When lid 54 is closed, electrical energy taken from power supply 66 is reduced to the lowest level possible.

FIGS. 5 and 6c shows communication device 50 in its normal telephone mode. In this second position for lid 54, electrical circuits associated with telephone communications such as cellular transmitter and receiver circuits 90 will be energized. When lid 54 is in its third, fully open position as shown in FIG. 6d, all of the electrical circuits and electrical components contained within communication device 50 will be fully energized. With lid 54 in its fully open position, the maximum electrical drain may occur with respect to power supply 66.

With communication device 50 in its fully open position shown in FIG. 6b, the gain for microphone 52 and speaker 53 may be increased and the appropriate electrical circuits energized for speaker phone operation. The functions presented on visual display 60 may also be modified for speaker phone operation when lid 54 is in its fully open position. The length of time that information is presented on visual display 60 may be controlled by the position of lid 54. For example, when lid 54 is fully open the visual display may be presented for an extended period of time. When lid 54 is in its normal telephone position of FIG. 6c, visual display 60 may be activated only for a limited time period required to complete the desired telephone communication function. As will be explained later in more detail, processor 80 and processor 280, along with their respective electrical circuits 62 and 262, provide the wide variety of options with respect to the operation of communication device 50. Therefore, the applications and functions associated with one position of lid 54 may be reprogrammed for other positions or eliminated as desired by the user of communication device 50.

FIG. 6b shows a fourth, intermediate position for lid 54 between its first, closed position of FIG. 6a and its second, telephone position of FIG. 6c. The intermediate position of FIG. 6b may be used for specifically selected special communication functions. For example, an important feature of the present invention is the ability to provide the user with information from a wide variety of sources. Therefore, if the user is particularly interested in information from the National Weather Service, the intermediate position of FIG. 6b can be used to energize the electrical circuits associated with monitoring National Weather Service reports. If another user is interested in information from a different source such as the Dow Jones News Retrieval, this same position could be programmed by processor 80 or 280 to energize the electrical circuits and applications associated with that particular information service. As will be explained later in more detail, the present invention allows communication device 50 to provide a wide range of communication options and information services to the user. The intermediate position of lid 54 shown in FIG. 6b may be used to energize the electrical circuits specifically associated with one of these options.

Lid 54 also performs other, very important functions. When lid 54 is closed, it protects visual display 60. As shown in FIG. 5, application module 100 may be inserted into lid 54. As will be explained later in more detail, a wide variety of application modules 100 may be used with communication devices 50 and 150. Depending upon the physical dimension of each application module 100 and the associated function, more than one application module 100 may be inserted into lid 54. Lid 54 will preferably include electrical connections (not shown) which are compatible with connector 106 provided on application modules 100. Lid 54 functions in part as a receptacle for connecting application modules 100 with common bus 64 and electrical circuits 62 and 262. Application modules 100 allow communication devices 50 and 150 to offer the user a wide range of options concerning communication networks, information storage, information exchange, information display, remote control of other equipment, etc.

FIG. 7 is a block diagram of integrated electrical circuit 62 satisfactory for use with either communication device 50 or communication device 150. An important element of the present invention is the use of common bus 64 which allows the addition of various communication and information options to communication devices 50 and 150 respectively. Common bus 64 provides sufficient capacity to transmit information between processor 80, resident memory 84 and application module 100. Common bus 64 preferably allows the transmission of at least 19 bits of information to address the various components associated with electrical circuit 62 and an additional 16 bits of information associated with the data base contained in each memory unit associated with electrical circuit 62. Additional capacity may be provided on common bus 64 for encoding and decoding information. The specific design for common bus 64 depends upon the specific requirements of resident memory 84, application module 100 and digital signal processor 76.

The major components of integrated electrical circuit 62 are electrically connected with bus 64. Power supply 66 may be one or more batteries associated with hand-held device 50, or a standard power supply associated with telephone circuits, or an enhanced power supply associated with peripherals such as a facsimile or modem. The specific type of power supply 66 used with desk top console 200 and desk top communication device 150 will depend upon the communication features which are being used, such as modem, facsimile, etc. Console 200 will preferably include a battery charger to recharge power supply 66 when hand-held communication device 50 is placed in console 200. For communication services which require a high power supply, a transformer connection (not shown) may be made from desk top communication device 150 and console 200 to a standard electrical outlet with an appropriate transformer (not shown) to reduce the normally available electricity to a voltage and current compatible with any batteries in power supply 66. Application modules 100 may contain their own battery power supply 166 to augment power supply 66 used in hand-held communication device 50.

As shown in FIG. 7, four electrical circuits are associated with interactive visual display 60. These circuits are touch controller 68, liquid crystal display controller 70 and its associated liquid crystal display memory 72 and contrast control 74. These same components may be used with visual display 160. An important feature of the present invention is the wide variety of additional electrical circuits which may be connected with common bus 64. As shown in FIG. 7, these circuits include digital signal processor 76, processor 80, resident memory 84 and application module 100.

Processor 80 functions as the central controller for electrical circuit 62 and the other electrical components associated with common bus 64. Processor 80 is preferably of a type designated as 80C51 microprocessors available from several sources including Intel or similar type processors available from Texas Instruments Incorporated such as the 370 family of processors. However, a wide variety of general purpose processors and microcontrollers may be satisfactorily used with the present invention. In electrical circuit 62, a separate resident memory 84 is provided to function with processor 80. Resident memory 84 contains the resident applications and core software programs which are associated with communication devices 50 and 150.

Modem 82, preferably a single chip with a modem integrated circuit, and computer terminal 88 are electrically connected with processor 80 as part of electrical circuit 62 to allow receipt and transmission of complex digital information between processor 80 and external sources such as a personal computer (not shown). Computer connection 88 is preferably an RS232 serial port connection appropriate for use with modem 82. Modem 82 will have at least the capability of 1200 baud and preferably the capability of 2400 to 4800 baud. Combining modem 82 with processor 80 and the other communications capabilities provided by electrical circuit 62 allows communication device 50 to convert any printer into a facsimile machine. Electrical circuit 62 also includes phone line connection 86. Phone line connection 86 may include a standard telephone communication port 158 as shown on communication device 150 in FIG. 3.

The use of processor 80 and its associated memory 84 in electrical circuit 62 and processor 280 and its associated memory 284 in electrical circuit 262 of FIG. 8 offers important advantages in standardization and insuring commonality in operation and function with respect to communication devices 50 and 150. For example, processor 80 in cooperation with either visual display 60 or digital signal processor 76 will allow the volume from speaker 53 to be automatically adjusted in response to either voice commands through microphone 52 and digital signal processor 76, or touch commands placed on visual display 60.

Communication devices 50 and 150 provide the user with three broad categories of applications and communication capabilities. Resident applications and basic functions such as standard telephone communications are provided by resident memory 84 in cooperation with processor 80, and the other components of electrical circuit 62. Examples of other resident applications provided by resident memory 84 include operation of modem 82, memory upload and download from application modules 100, utility programs required to operate processor 80 and digital signal processor 76, and telephone paging services.

Visual display 60*b* shown in FIG. 9*a* is an example of the enhanced paging functions offered by combining processor 80, resident memory 84 and visual display 60 as part of electrical circuit 62. Processor 80 may be programmed such that the paging circuit will alert the user when lid 54 is in any of the positions shown in FIGS. 6*a*, 6*b*, 6*c* and 6*d*. The use of the intermediate position of lid 54 shown in FIG. 6*b* may be particularly appropriate for paging functions offered by communication device 50. As previously noted, telephone paging functions may be selected as one of the circuits which remains energized even when lid 54 is in its closed position. In this condition, speaker 53 is available to alert the user that a paging message has been received. Display 60*b* provides information concerning the date the page message was received, the type of message, voice mail or fax, and the telephone number. Resident memory 84 in cooperation with processor 80 and liquid crystal display controller 70 allows selecting the type and format of paging information received by the user of communication device 50.

The applications and communication functions provided by various application modules 100 will be discussed later in more detail. Information services 30 and 32 may provide applications such as Compuserve and Prodigy, Dow Jones news retrieval services, geographical information, weather services, city map locator, electronic and voice mail and other on-line database services. Facsimile capabilities may be provided by a selected application module 100 and/or from information services 30 and 32.

Additional components of electrical circuit 62 include CODEC or encoder/decoder 78, microphone 52 and speaker 53. Microphone 52 transforms voice communication into an analog electrical signal which is transformed by CODEC 78 into a digital bit stream for further processing by digital signal processor 76. In the same manner, digital signal processor 76 supplies a digital bit stream to CODEC 78 to provide an analog input to speaker 53 for audible communication purposes. An encoder/decoder 78 satisfactory for use in the present invention is available from Texas Instruments with part number TCM2917. Various types of digital signal processors are commercially available for use as digital signal processor 76 in electrical circuit 62. One such digital signal processor is available from Texas Instruments in Dallas, Tex. with a part number TMS320C51. As the capabilities of available digital signal processors increase, functions performed by processors 80 and 280 may be combined with digital signal processor 76.

Voice recognition and voice command capabilities of communication device 50 and communication device 150 offer important features and significant advantages for the present invention. Since the user speaks into the same microphone 52, 152 or 153 with the respective communication device 50 or 150, the capabilities and the reliability of voice recognition are greatly improved. User dependent spoken commands may be used to select the various communication options available from communication devices 50 and 150. Spoken speed dialing numbers and spoken command selection of the various programs and applications offered by communication devices 50 and 150 represent only two of the very large number of options available from using resident memory 84, processor 80 and digital processor 76 in conjunction with each other in integrated circuit 62 and application modules 100.

Using voice commands, microphone 52, CODEC 78 and digital signal processor 76 allow inputting information onto signal bus 64 in the same manner as touch sensitive visual display 60. An important feature of the present invention is that any function performed by the use of touch sensitive visual display 60 may also be performed by voice actuation signals Via microphone 52. Portions of the voice activation and voice communication capability may be provided at central facility 22. However, the present invention allows including CODEC 78 and digital signal processor 76 as part of each personal communication device 50 and 150 respectively. Digital signal processors designated TSM320 are available from Texas Instruments in Dallas, Tex. for use with communication device 50 and 150. One or more MULTI-SERVE™ media servers which are also available from Texas Instruments may be provided at the central communication facility to work in conjunction with personal communication devices 50 and 150.

U.S. Pat. No. 4,712,242 titled "Speaker-Independent Word Recognizer" and U.S. Pat. No. 4,882,757 titled "Speech Recognition System" provide examples of voice recognition equipment and associated electrical circuits which may be satisfactorily used with the present invention. U.S. Pat. Nos. 4,712,242 and 4,882,757 which are assigned to Texas Instruments are incorporated by reference for all purposes within this application. Digital signal processors along with data encryption and decryption equipment and applications are available from Texas Instruments in Dallas, Tex. A booklet entitled Theory, Algorithms, and Implementations Volume 1 provides information concerning digital signal processing applications with the TMS320 family available from Texas Instruments. Chapter 16 of this booklet contains information for implementation of data encryption standards using the TMS32010 digital signal processor.

Many of the components shown in electrical circuits 62 function in the same manner in electrical circuits 262 of FIG. 8. For example, processor 280 performs all of the functions previously described for processor 80 in electrical circuit 62. One of the differences is that processor 280 includes a self-contained memory unit 284 rather than requiring the separate memory unit 84 as shown in FIG. 7 for electrical circuit 62. Memory unit 284 may be used to perform the same functions as memory unit 84. A microprocessor designated as 87C51 with its own associated memory unit is commercially available from several sources and is satisfactory for use as processor 280 and resident memory 284. Other types of general purpose processors and microcontrollers with built-in memory units may be satisfactorily used as processor 280 and resident memory 284.

Touch controller 68 performs the same functions in both electrical circuits 62 and electrical circuits 262. Touch controller 68 may also be used in conjunction with processors 80 and 280 to provide telephone keypad 154 shown on communication device 150 and in FIG. 9a. Electrical circuit 262 may be used with either communication device 50 or communication device 150.

As previously noted, integrated circuit 262 of FIG. 8 offers several alternative embodiments of the present invention as compared to integrated circuit 62. One important feature of electrical circuit 262 is the use of dual microphones 77 and 177. The use of two microphones greatly enhances the quality of the audio transmission from communication device 50 or 150 when electrical circuit 262 is used within the respective communication device. Microphone 177 provides an input to digital signal processor 76 through its own separate CODEC 178 which will cancel using phase shift technology or similar approaches, any ambient sound which may be applied to the outgoing transmission signal through microphone 77. Thus, microphone 177 cooperates with microphone 77 and digital signal processor 76 to block transmitting environmental noise from communication device 50 or 150 onto communication system 20. In the same manner, digital signal processor 76 may be used to cancel or filter ambient noise which has been superimposed upon any incoming or received signal by electrical circuit 262. Also, digital signal processor 76 in cooperation with CODEC 78 will filter out any stable sound patterns or sound characteristics associated with communication system 20, the particular communication network being used and electrical circuits 262 within communication device 50 and communication device 150. The net result of incorporating digital signal processor 76 and processor 280 into electrical circuit 262 is a substantially improved transmission and receipt of audio information.

Wireless communication circuits 90 have also been added to common bus 64 as part of electrical circuits 262. Wireless communication circuits 90 may provide standard, cellular communication capability or other special radio frequencies associated with radio telephones. Antenna 92 will also be included as part of any communication device 50 which has electrical circuit 262. Tri-state buffer 94 is preferably included as part of electrical circuits 262. Tri-state buffer 94 smoothes out the interruption of electrical signals on bus 64 when application modules 100 are inserted and removed from communication devices 50 and 150. As the electrical circuits and the memory storage capacity of application modules 100 are increased, the need for a Tri-state buffer 94 also increases.

An important feature of the present invention is providing interactive visual display 60 as part of communication device 50 and interactive visual display 160 as part of communication device 150. Visual displays 60 and 160 are preferably touch-sensitive which greatly enhances the communication options and versatility offered by communication devices 50 and 150. Visual displays 60 and 160 are preferably either color or monochrome liquid crystal displays which may be used to provide graphic and textual information to the user.

Other types of touch sensitive visual displays may be satisfactorily used with the present invention. Examples of other visual displays satisfactory for use with the present invention include electro-chromatic, light emitting diodes, electron emitters behind a phosphor cover sheet, etc. Other examples of flat screen displays satisfactory for use with the present invention include digital micromirror devices (sometimes referred to as deformable mirror devices) which are available from Texas Instruments, Inc. in Dallas, Tex. The digital micromirror device may be particularly advantageous for use with desktop communication device 150.

Visual displays 60 and 160 provide the basis for an intuitive user interface which may be used to both operate their respective communication device 50 or 150 and to transmit or receive information from other sources. Visual displays 60 and 160 function as an interface for the user of communication devices 50 and 150 respectively to perform complex communication and control functions with simple touch commands. Visual displays 60 and 160 will preferably have dimensions of at least 480 by 128 pixels to accommodate the communication and control functions provided by the present invention.

There are several general types of touch-sensitive visual displays which may be satisfactorily used with the present invention. Visual displays 60 and 160 may be selected from any of these types. One general type of touch-sensitive visual display is an analog system in which a resistive material is biased with a low voltage on one axis and a higher voltage across the other axis. This type of visual display includes resistive material such that when the user touches one portion of the display it can determine the ratio between the high voltage and low voltage. The output from the contact caused by touching the visual display surface is a digital signal that is forwarded to processor 80 or 280 via touch controller 68. Based on the voltage, the signal indicates if it came from the left, right, top or bottom of the visual display. Processor 80 or 280 can give information back to touch controller 68 indicating that processor 80 or 280 knows that the user touched a particular set of pixels within the respective display.

Another type of touch-sensitive display satisfactory for use with the present invention is referred to as the matrix type. For this visual display, the screen is broken down into small pieces. For visual display 60 the matrix might be 10×4 units to facilitate use with a hand-held device. For visual display 160 in desk top communication device 150, the matrix might be 10×10 units or 15×15 units. The specific dimensions of the matrix are selected to correspond with the smallest size which the user can readily determine by touching the display. For example, the units might be selected to correspond with the size of a normal user's finger. The matrix type touch sensitive visual display converts each touch on the display into a digital number. Therefore, each matrix in the visual display has its own specific location.

Other types of touch-sensitive visual displays satisfactory for use with the present invention include surface acoustic wave sensors, capacitance sensors, and electron scanning beams. The present invention allows incorporating any satisfactory touch-sensitive visual display with the other components of electrical circuits 62 and 262.

As previously explained, visual displays 60 and 160 provide significant enhancement in the communication capabilities of communication devices 50 and 150 respectively. In addition, digital signal processing circuit 76 and CODEC 78 cooperate with microphone 52 and speaker 53 to provide the same communication capabilities and information capabilities in response to voice commands. The full range of capabilities of communication devices 50 and 150 may be obtained by using touch-sensitive visual displays 60 and 160 or by using voice commands through CODEC 78 and digital signal processor 76. The flexibility of using either voice commands or touch-sensitive visual display 60 and 160 provides significant flexibility for the user of communication devices 50 and 150.

Figure 10:
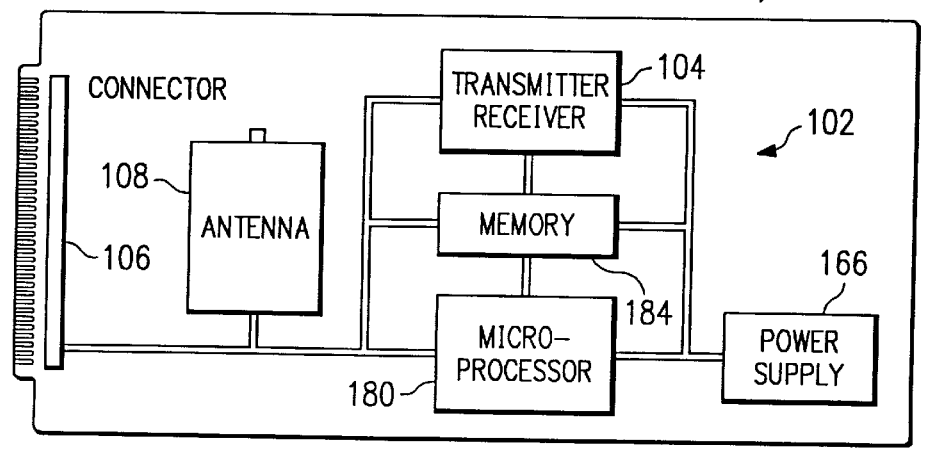
FIG. 10 is a block diagram for a typical electrical circuit used with an application module incorporating the present invention.

FIG. 10 shows a typical block diagram of an electrical circuit 102 which may comprise a portion of application module 100. The basic components of electrical circuit 102 include power supply 166, processor 180, memory 184, transmitter and receiver 104, antenna 108, and connector 106. Connector 106 is preferably a 68-pin connector commonly used in advanced integrated circuits and compatible with common bus 64. Other types of edge and multiple pin connectors may be used with application module 100. The specific number and type of components placed on each application module 100 depends upon the communication, control function or other application which will be supplied by the specific application module 100. Selected application modules 100 may provide only software programs for a specific communication function or may provide software programs and electrical components to perform specific communication, control or information processing applications.

For example, one application module 100 may be used to only provide additional memory to augment resident memory 84 or 284. In this case, application module 100 might have only connector 106 and program memory 184. For other functions, module 100 may have all of the components as shown in FIG. 10. An example of the need for a more complex electrical circuit provided by module 100 would be when communication device 50 is used to provide infrared communication capability. For such capability, power supply 166 would include one or more batteries to augment or assist power supply 66 associated with communication device 50. Transmitter and receiver 104 would include an appropriate infrared signal generator. Antenna 106 would preferably include one or more light-emitting diodes associated with infrared communication systems. A selected application module 100 could be provided with programs and/or electrical circuits to perform all or a portion of the voice recognition functions described for digital signal processor 76 and CODEC 78.

Application modules 100 may be used to convert communication devices 50 and 150 into an operating mechanism for a wide variety of systems and functions which extend beyond the normal telephone and radio communication networks. Application modules 100 may provide the algorithm, database, software, and/or special hardware required to provide these additional functions and applications. For example, a selected application module 100 may be used to convert communication device 50 into a remote control unit for operating a television, video cassette recorder, or a garage door opener. Another application module 100 may be used to allow communication devices 50 and 150 to function as personal databases for the user and to integrate information from the database into the various communication functions provided by communication device 50 and 150. Application modules 100 result in communication devices 50 and 150 being part of an open system which can be expanded as desired by the user.

Application module 100 could also be designed for use with a low power wireless communication system sometimes referred to as PBX systems found in large commercial buildings and hospitals. For this purpose, circuit 102 would include transmitter and receiver 104 having the appropriate frequency for the broadcasting system in a specific building and microstrip antenna 108 for communicating with the building's internal wireless PBX system. Thus, information associated with the specific building such as a patient's medical status may be transmitted within a hospital to a doctor having communication device 50 and the appropriate application module 100. The selected application module 100 for each building may function as a transponder, which identifies the user of communication device 50 to the building PBX system.

U.S. Pat. No. 4,153,937 titled "Microprocessor System Having High Order Capability" and U.S. Pat. No. 4,295,181 titled "Module For An Integrated Circuit System" provide examples of the types of integrated circuits which may be placed on application modules 100. U.S. Pat. Nos. 4,153,937 and 4,295,181 which are assigned to Texas Instruments are incorporated by reference for all purposes within this application.

Wireless communication functions may be provided by communication device 50 through the use of integrated circuit 262 with wireless communication circuits 90 in cooperation with one or more application modules 100. For communication devices 50 and 150 which have integrated electrical circuit 62, wireless communication functions may be provided solely by one or more application modules 100. When wireless communication functions are provided by a selected application module 100, the appropriate microstrip antenna 108 may be included as part of the application module 100. When wireless communication functions are provided by circuits 90, information may be stored in program memory 184 of the selected application module 100 to properly position antenna 92 for the electromagnetic frequency spectrum associated with the selected application module 100.

When wireless communication circuits 90 are built into integrated circuit 262, it is sometimes difficult to reconfigure or readjust these built-in communication circuits when additional frequencies become available for use with communication devices 50 and 150. An important feature of the present invention is that selected application modules 100 may be inserted into communication device 50 or 150 to provide additional frequency capability as additional portions of the electromagnetic spectrum are made available for use with communication system 20. One application module 100 may be selected to provide communication in the 900 megahertz range. Another application module 100 may be selected to provide wireless communication in the frequency range associated with cordless telephones. Application modules 100 allow communication devices 50 and 150 to provide wireless communication throughout the full range of the electromagnetic spectrum.

In addition to providing capabilities in different portions of the electromagnetic frequency spectrum, the respective application modules 100 may also include the protocol appropriate for each type of communication. For example, the protocol used with PBX communication systems within a building are substantially different from the communication protocols used in cellular telephone networks. These protocols are also subject to revision and change as each specific communication network is modified. When a change in protocol occurs, the affected application module 100 may simply be replaced without requiring extensive rework or modification of communication devices 50 and 150.

As previously noted, a wide variety of application modules 100 may be used with communication devices 50 and 150. Each communication capability or function provided by application modules 100 may be activated and controlled by either touch sensitive visual displays 60 and 160 or voice commands via digital signal processor 76. Processor 180 and memory 184 provided in electrical circuit 102 cooperate with each other to provide a wide range of capabilities with respect to application modules 100. For example, a user may store information on application module 100 to indicate the user's preference with respect to the type of information presented on visual display 60 or 160, a series of frequently used long distance telephone numbers and access codes, and telephone numbers to obtain information from information services 30 and 32. A selected application module 100 may be programmed to screen undesired telephone calls. Application modules 100 may also provide a calendar or date reminder services or allow visual displays 60 and 160 to function as calculators.

Application modules 100 in cooperation with the appropriate processor 80 or 280 and associated digital signal processor 76, CODEC 78 and microphones 52, 77, or 153 allow the user of communication device 50 or 150 to select the desired level of security appropriate for each type of communication function. A selected application module 100 may be provided with an electrical circuit such as presently available "scramblers". Electrical circuit 102 on the selected application module can provide encryption and decryption with respect to graphic and textual information transmitted between communication devices 50 and 150 and central facility 22.

Digital signal processor 76 and its associated voice activation circuits allows enhanced security as compared to only using a selected application module 100 for "scrambling" or encryption and decryption of the transmitted information. Digital signal processor 76 allows voice verification of the user of communication device 50 and 150. Voice verification information may be stored at central facility 22 and/or within digital signal processor 76. Voice verification insures that only authorized users are sending and receiving information over communication network 20. For example, the user of communication device 50 with voice commands may activate a selected communication application and communication network with central facility 22 that provides secure communications by encryption and decryption of the transmitted information. In addition, the voice command used at communication device 50 may be verified by central facility 22 to confirm the identity of the user. Thus, central facility 22 may broadcast highly sensitive valuable information in a coded format to communication device 50 or 150 with a high degree of confidence that only an authorized user of communication device 50 or 150 will receive the valuable, sensitive information.

Authentication of the user of communication device 50 and 150 may also be provided by having the user inserting a preselected code using visual display 60 or 160. Voice verification of the user of communication device 50 and 150 is preferred due to the unique characteristics of voice information. Code words and code numbers may be lost or stolen which compromises the integrity of the associated security system. Voice authentication and verification substantially reduces this risk of compromising communication security. The previously described encryption and decryption system could be hardwired into the integrated electrical circuits 62 and 262. However, providing encryption and decryption with a selected application module 100 offers enhanced flexibility for the user of communication devices 50 and 150.

Voice authentication capabilities offered by digital signal processor 76 in conjunction with microphone 52 provides several unique capabilities for communication device 50. Since the same microphone 52 is used by the user, digital signal processor 76 can quickly develop a template of the user's voice and readily recognize commands from the user. Therefore, if an application module 100, which allows opening the users' garage door was installed in communication device 50, digital signal processor 76 in cooperation with processor 80 would only allow communication device 50 to respond to the users' voice in opening the garage door. When communication device 50 is used as part of a cellular telephone network, the identification of the specific communication device 50 is generally transmitted to the central facility 22 as part of the cellular network protocol. Voice recognition of the user provided by digital signal processor 76 allows confirmation of the users' identity in addition to the identification number of the specific communication device 50. Since the user speaks into the same microphone 52, a voice recognition template may be easily constructed at both the central facility 22 and within digital signal processor 76. Thus, voice recognition can be used for multiple security purposes including insuring that only authorized programs and application are carried out by communication devices 50 and 150 and for insuring that only an authorized user is operating communication devices 50 and 150.

In addition to the previously described security systems and procedures, processor 180 in electrical circuit 102 allows varying the frequency at which wireless communication is transmitted by communication devices 50 and 150. Thus, processor 180 may be programmed to skip or to change frequencies in a pattern which can only be understood by central facility 22. Application modules 100 allow selecting the degree or the level of security and the type of security features which may include but are not limited to voice verification of the user, encryption and decryption of the information transferred and received, and frequency hopping during transmissions. For complex security functions more than one application module 100 may be installed in lid 54.

All communication networks have limited capacity for transmitting information and data. As the variety and volume of information increases, the capacity of each communication network becomes a limiting factor for the number of users which can use a specific network. Application modules 100 and processors 80 and 280 offer substantial opportunities to reduce the amount of information which must be transmitted over a specific communication network.

FIGS. 9a through 9d show various types of information which may be displayed to the user of communication device 50. All of the information shown in each visual display 60b, 60c, 60d and 60e may be transmitted from an appropriate information service 30 or 32. However, much of the information shown on these visual displays is standard and either does not change or changes only occasionally over time. This relatively constant information may be stored in memory 184 of the selected application module 100 to substantially reducing the amount of information which must be transmitted from information service 30 or 32 via the specific communication network to create the desired visual display 60b, 60c, 60d or 60e. Therefore, only information which is critical in nature or has changed must be transmitted via the selected communication network. This feature substantially expands and improves the capabilities of communication system 20. For example, the downtown map of Dallas, Tex. shown in display 60e may be activated by only a very limited digital signal or code assigned to this particular display.

Visual display 60a shown in FIG. 7 represents standard telephone capabilities offered by touch sensitive visual display 60 in cooperation with communication device 50. This same information and capabilities may be offered by visual display 160. Selected portions of visual display 60a provide all of the functions normally associated with current state of the art telephones, such as connect, transfer, hold and automatic redial. It is important to note that these same functions and operating procedures are provided with both the hand held communication device 50 and desk top communication device 150.

Visual display 60b shown in FIG. 9a represents the advanced communication and paging capabilities offered by the present invention. The information shown on display 60b indicates the status of information available to the user from either central facility 22 or information service 30 or 32. By touching the appropriate portion of touch sensitive display 60, each of these messages will be presented to the user. Processor 80 in cooperation with liquid crystal display controller 70 allows selected messages on visual display 60 to flash, such as the voice mail message at time 8:22 would flash until this voice mail message has been reviewed by the user. The lower portion of visual display 60b shows additional communication functions 154 available from communication devices 50 and 150. Processors 80 and 280 allow programming their associated communication device 50 and 150 to screen calls from selected telephone numbers.

Visual display 60c is an example of price list information which can be made readily available to sales personnel and other representatives of a company. As previously noted, the basic information shown on visual display 60c may be stored in program memory 184 on the appropriate application module 100. When the price list application is activated for communication device 50 or 150, only changes in the price list need to be transmitted via the communication network. The other information concerning part numbers, item numbers and prices, which has not changed, is presented on visual display 60c without requiring additional electromagnetic transmissions from central facility 22. This same benefit applies to stock prices shown on visual display 60d and the map locator shown on visual display 60e. Some of the applications available from different application modules 100 include enhanced telephone, price list, stock exchange and electronic map or locator services.

Program memory 184 with processor 180 of application modules 100 along with liquid crystal display controller 70 and processor 80 with resident memory 84 cooperate to allow a condensed format for information transmitted by communication system 20 to control the format and composition of information presented on visual display 60 without requiring transmission of pixel by pixel information. Common graphic symbols such as a circle, square, parallel lines, and similar graphic information may be stored in either liquid crystal display controller 70 or resident memory 84 and called up for use on visual display 60 by a high level display description language. Unique information such as the pricing format shown in visual display 60c of FIG. 9b may be stored in program memory 184 of the appropriate application module 100 used for communicating pricing information. Pixel level control information is provided from memory 184 and processor 180 rather than transmission over a communication network from another source within communication system 20.

The quality of the graphic information and the type of graphic information presented on visual display 60 is a function of liquid crystal display controller 70 and/or the associated application module 100. The information transmitted by communication system 20 is the same high level display information without requiring a different language or display information for each type of communication device and without depending upon the resolution quality of the particular visual display screen used in communication device 50 or 150.

Touching visual display 60 can be used as an input to program memory 184 via processor 180 on the appropriate application module 100. The input signal will include coordinates of the pixels that were touched on visual display 60. Touch controller 68 in cooperation with processor 80 and liquid crystal display controller 70 allows the user to control the presentation on visual display 60. For example, the user may touch a portion of visual display 60 which calls for presenting alphanumeric characters. Parameters for these characters such as upper case, lower case, font and size would be contained within program memory 184 as appropriate for the particular type of application performed by the associated application module 100. As another example, interactive visual display 60 may be touched by the user in the appropriate location to call up telephone communication functions represented by visual display 60a. The request from the user for "telephone" as shown in visual display 60f of FIG. 8 provides an input to both resident memory 284 and program memory 184 in the selected application module 100 which provide the parameters for the buttons shown in visual display 60a. These parameters which are stored in the appropriate program memory 184 would include midpoint, size, shape (round, square, etc.), type of corner (round, slant, sharp), surface quality and shading. Other pictorial elements associated with a particular communication function activated by visual display 60 would also be provided by program memory 184. These functions include, but are not limited to, line width, the starting and ending coordinates for any lines, any curvatures within lines, and any patterns or textures associated with each communication function and its related graphical presentation on visual display 60.

Various menus for the applications available within communication devices 50 and 150 will be presented on their respective visual displays 60 and 160. Since the visual displays 60 and 160 are touch sensitive, static pressure above a fixed threshold of time may be used to activate the specific application shown on the menu. Static pressure on a selected number of pixels provides input to the associated electrical circuit 62 or 262.

Visual display 60f shown in FIG. 8 is a representation of one of the menus for communication programs and applications available with communication devices 50 and 150. Static pressure on the portion of the menu in display 60f labeled "telephone" will result in producing telephone functions as represented by visual display 60a of FIG. 7. In the same manner, static pressure on the application labeled "hospital" will activate communication programs associated with a particular hospital communication network. As previously noted, a selected application module 100 should also be inserted into communication device 50 to modify electrical circuit 262 for use with the particular hospital communication network. In the same manner, static pressure on other portions of visual display 60f will provide other communication functions such as "Secure Communications" when desired. Again, the appropriate application module 100 will need to be inserted into communication device 50 or 150 to correspond with the application selected on the menu of visual display 60f.

In addition to static pressure signals, touch sensitive visual displays 60 respond to movement or stroking gestures across the surface of each visual display. Gestures such as moving up, down, diagonally or sideways across visual display 60 may provide input via the appropriate touch controller 68 to the associated processor 80 or 280. Each gesture may be coded to indicate a higher level of display description language which will be presented on visual display 60. Touch controller 68 is programmed to respond to gestures which exceed a threshold requirement for distance travelled across the surface of visual display 60 and pressure applied to the surface of visual display 60. The above comments also apply to using static pressure and gestures to operate visual display 160.

Gestural input is a particularly important advantage of the present invention with respect to navigating through the many menus which are available as a result of the wide variety of communication applications and control functions offered by the present invention. Gestural movement across the surface of visual displays 60 and 160 are particularly beneficial in moving either forwards or backwards through the various menus provided by communication devices 50 and 150.

Visual display 60f of FIG. 8 has an arrow labeled "forward" at the top of the menu and an arrow labeled "backward" at the bottom of the menu. Gestural movement across the word "forward" in the direction indicated by the arrow will cause the menu on display 60f to move forward with respect to other programs and applications available with electrical circuit 262 and the respective application module 100 connected with electrical circuit 262. In the same manner, gestural movement across the word "backward" in the direction indicated by the arrow will cause the menu on 60f to move backward with respect to the available programs and applications. The previous description applies to only one of the many uses of gestural movements on interactive visual displays 60 and 160 to improve the user interface with communication devices 50 and 150 and communication system 20.

Additional information concerning touch screen visual displays may be found in an article titled "Touchscreen Interfaces for Alphanumeric Data Entry" published by the Proceedings of the Human Factors Society 36th Annual Meeting in 1992 written by Catherin Plaisant and Andrew Sears. Additional information concerning gestural movement and the use of gestural movement on interactive visual displays may be found in an article titled "Gesture Set Economics for Text and Spreadsheet Editors" published by the Proceedings of the Human Factor Society 34th Annual Meeting 1990 written by Lewis A. Blatt and Alan Schell.

While this invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. Apparatus for integrating communication functions, information storage and processing functions, and control functions, comprising:

a plurality of electrical circuits for communicating information, including a processor and an associated memory for executing communication, control, and information programs and applications with the electrical circuits;

a microphone for entering information into the apparatus;

a speaker for receiving information from the apparatus;

an interactive visual display for providing an interface between the apparatus and a user of the apparatus;

a receptacle for installing at least one of a plurality of interchangeable application modules into the apparatus;

each application module having an electrical circuit for executing communication programs and applications in cooperation with the electrical circuits of the apparatus; and voice recognition means for activating selected communication programs and applications.

2. The apparatus as defined in claim 1 wherein selected application modules provide specific communication programs and applications in addition to the programs and applications provided by the processor and the associated memory of the apparatus.

3. The apparatus as defined in claim 2 wherein the visual display further comprises a touch sensitive portion for activating selected communication programs and applications provided by the processor and the associated memory of the communication of the apparatus and the selected application modules.

4. The apparatus as defined in claim 3 wherein selected application modules each further comprise a processor and a memory unit associated with specific communication programs and applications provided by the electrical circuit of the selected application module.

5. The apparatus as defined in claim 4 wherein one of the application modules further comprises electrical circuits and programs for providing telephone paging functions with the apparatus.

6. The apparatus as defined in claim 4 wherein one of the application modules further comprises a list of long distance telephone numbers with programmed access codes and a program which responds to spoken commands from the microphone.

7. The apparatus as defined in claim 4 wherein a selected application module further comprises programs and applications for providing telephone functions with the apparatus and provides means for screening undesired telephone calls.

8. The apparatus as defined in claim 4 wherein a selected application module further comprises electrical circuits and programs for converting the apparatus into a remote control unit for other equipment.

9. The apparatus as defined in claim 8 wherein the selected application module further comprises programs which allow remote operation of the other equipment in response to spoken commands after having authenticated a voice of the user.

10. The apparatus as defined in claim 4 wherein a selected application module further comprises a transmitter and receiver disposed within the electrical circuit provided by the application module for functioning as a transponder to identify the apparatus to a local communication network.

11. A communication device for transmitting and receiving information in a communication system having a plurality of communication networks comprising:

a plurality of electrical circuits for communication and storing information including a processor and an associated memory for executing communication programs and applications with the electrical circuits;

a microphone for entering information into the communication device;

a speaker for receiving information from the communication device;

an interactive visual display for displaying selected information associated with each communication program and application;

a receptacle for installing at least one of a plurality of interchangeable application modules into the communication device; and each application module having an electrical circuit for executing communication programs and application in cooperation with the electrical circuits of the communication device.

12. The communication device as defined in claim 11 wherein selected application modules provide specific communication programs and applications in addition to the communication programs and applications provided by the processor and the associated memory of the communication device.

13. The communication device as defined in claim 12 wherein the visual display further comprises a touch sensitive portion for activating selected communication programs and applications provided by the processor and the associated memory of the communication device and the selected application modules.

14. The communication device as defined in claim 13 wherein selected application modules each further comprise a processor and a memory for executing the specific communication program and application provided by the electrical circuits of the selected application modules.

15. The communication device as defined in claim 14 wherein one of the application modules further comprises electrical circuits and programs for providing telephone paging functions with the communication device.

16. The communication device as defined in claim 14 wherein one of the application modules further comprises a voice activation network for activating selected communication programs and applications provided by the processor and the associated memory of the communication device and the selected application module.

17. The communication device as defined in claim 16 wherein one of the application modules further comprises a listing of information services which are accessible via the voice activation circuit.

18. The communication device as defined in claim 14 wherein one of the selected application modules further comprises a list of long distance telephone numbers with programmed access codes and a program which responds to spoken commands from the microphone.

19. The communication device as defined in claim 14 wherein one of the selected application modules further comprises a transmitter and receiver disposed within the electrical circuit provided by the application module.

20. The communication device as defined in claim 14 wherein one of the selected application modules further comprises application programs for converting the communication device into a remote controlled unit for other equipment.

21. The communication device as defined in claim 20 wherein the selected application module further comprises application programs which allow remote operation of the other equipment only in response to voice commands which have been authenticated from an authorized user of the communication device.

22. The communication device as defined in claim 14 wherein one of the application modules further comprises a telephone directory of names and telephone numbers.

23. The communication device as defined in claim 14 wherein one of the application modules further comprises a transponder for identifying the communication device to a local communication network contained within a building.

24. The communication device as defined in claim 14 wherein one of the application modules further comprises a listing of information services which are accessible via the visual display.

* * * * *